United States Patent
Gordon et al.

(10) Patent No.: US 10,802,483 B2
(45) Date of Patent: Oct. 13, 2020

(54) EMERGENCY PUBLIC DEACTIVATION OF AUTONOMOUS VEHICLES

(71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, Elmford, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/787,756

(22) Filed: Oct. 19, 2017

(65) Prior Publication Data
US 2019/0121355 A1 Apr. 25, 2019

(51) Int. Cl.
*G05D 1/00* (2006.01)
*G06T 7/70* (2017.01)
(Continued)

(52) U.S. Cl.
CPC ......... *G05D 1/0061* (2013.01); *G05D 1/0016* (2013.01); *G05D 1/0022* (2013.01);
(Continued)

(58) Field of Classification Search
None
See application file for complete search history.

(56) References Cited

U.S. PATENT DOCUMENTS

| | | | | |
|---|---|---|---|---|
| 5,777,565 A | * | 7/1998 | Hayashi | G07B 15/063 340/928 |
| 7,005,997 B1 | * | 2/2006 | Wiewiura | F16P 3/147 340/3.1 |

(Continued)

OTHER PUBLICATIONS

Crum G L; Ttl: An active emergency stop design and protocol for unmanned vehicles; Publication Ttl: Proceedings of SPIE—The International Society for Optical Engineering; 2006; Publisher: SPIE; Country of Publication: USA; ISSN: 0277786X; Database: Ei Compendex (R).

(Continued)

*Primary Examiner* — Jean Paul Cass
(74) *Attorney, Agent, or Firm* — Garg Law Firm, PLLC; Rakesh Garg; Anthony Curro (57) ABSTRACT

Using an imaging device of a user device associated with a public user, an image of an autonomous vehicle (AV) operating in an area is captured. The public user associated with the user device is other than an occupant or controller of the AV. Image processing of the image is performed to extract a set of visual characteristics of the AV. A visual characteristic in the set of visual characteristics is insufficient to uniquely identify the AV. From a set of AVs a subset of candidate AVs is selected where each candidate AV in the subset of candidate AVs matches within a tolerance at least one visual characteristic in the set of visual characteristics, the subset of candidate AVs including the AV. A stop command is sent to the AV, causing the AV to execute a stopping operation resulting in a change in a velocity of the AV.

20 Claims, 7 Drawing Sheets

(51) Int. Cl.
*G06K 9/62* (2006.01)
*G06K 9/00* (2006.01)

(52) U.S. Cl.
CPC ....... *G06K 9/00664* (2013.01); *G06K 9/6202* (2013.01); *G06T 7/70* (2017.01); *G05D 1/0088* (2013.01); *G05D 2201/0213* (2013.01); *G06T 2207/10004* (2013.01); *G06T 2207/30252* (2013.01)

(56) References Cited

U.S. PATENT DOCUMENTS

| | | | | |
|---|---|---|---|---|
| 7,103,460 | B1 * | 9/2006 | Breed | B60C 23/0408 701/29.1 |
| 8,849,494 | B1 * | 9/2014 | Herbach | B60W 60/0015 701/24 |
| 8,996,224 | B1 * | 3/2015 | Herbach | G05D 1/0011 701/23 |
| 9,008,890 | B1 * | 4/2015 | Herbach | G05D 1/0297 701/26 |
| 9,406,177 | B2 | 8/2016 | Attard et al. | |
| 9,507,346 | B1 * | 11/2016 | Levinson | B60W 30/0956 |
| 9,855,890 | B2 * | 1/2018 | James | B60Q 1/503 |
| 9,870,437 | B2 * | 1/2018 | Pope | G06F 30/13 |
| 9,910,441 | B2 * | 3/2018 | Levinson | G05D 1/0214 |
| 9,932,038 | B1 * | 4/2018 | Zhu | G05D 1/0088 |
| 9,953,538 | B1 * | 4/2018 | Matthiesen | B60Q 1/482 |
| 10,133,275 | B1 * | 11/2018 | Kobilarov | G06N 3/08 |
| 10,255,582 | B2 * | 4/2019 | Shydo, Jr. | G06K 17/0022 |
| 10,303,257 | B2 * | 5/2019 | Hillis | B60Q 1/26 |
| 2004/0248071 | A1 * | 12/2004 | Bedziouk | A63B 24/00 434/247 |
| 2009/0248231 | A1 | 10/2009 | Kamiya | |
| 2012/0083960 | A1 * | 4/2012 | Zhu | B60R 1/00 701/23 |
| 2013/0104186 | A1 * | 4/2013 | Dietz | H04W 12/02 726/1 |
| 2015/0235484 | A1 * | 8/2015 | Kraeling | G07C 5/0866 701/1 |
| 2015/0348112 | A1 * | 12/2015 | Ramanujam | G06Q 30/0266 705/14.63 |
| 2015/0348335 | A1 * | 12/2015 | Ramanujam | G05D 1/0088 701/23 |
| 2016/0292872 | A1 * | 10/2016 | Hammond | B64C 39/024 |
| 2016/0334230 | A1 | 11/2016 | Ross et al. | |
| 2016/0378112 | A1 | 12/2016 | Ljubuncic et al. | |
| 2017/0015288 | A1 | 1/2017 | Coelingh et al. | |
| 2018/0202822 | A1 * | 7/2018 | Delizio | G01C 21/3407 |
| 2018/0338241 | A1 * | 11/2018 | Li | G08B 21/24 |
| 2018/0374002 | A1 * | 12/2018 | Li | G06F 3/017 |
| 2019/0056902 | A1 * | 2/2019 | Batten | B60R 25/305 |

OTHER PUBLICATIONS

Kwon et al.; Ttl: Autonomous emergency stop system; Publication Ttl: 2014 IEEE Intelligent Vehicles Symposium Proceedings; 2014; Publisher: IEEE; Country of Publication: USA; ISBN: 9781479938373; Database: INSPEC.

* cited by examiner

EMERGENCY PUBLIC DEACTIVATION OF AUTONOMOUS VEHICLES

TECHNICAL FIELD

The present invention relates generally to a method, system, and computer program product for managing autonomous vehicles. More particularly, the present invention relates to a method, system, and computer program product for public user deactivation of autonomous vehicles.

BACKGROUND

Hereinafter, an autonomous vehicle (AV) includes any ambulatory machine that can set itself in motion to travel from one geographical point to another point (auto-propulsion) on surface, in air, or through water. Examples of AV include but are not limited to self-driving automobiles, ambulatory robotic entities, self-propelled drones, and many other manifestations. A reference to a vehicle herein is a reference to an AV unless expressly disambiguated where used.

Some AVs, such as self-driving automobiles, have a built-in mechanism for stopping the motion of the AV. Generally, such stopping mechanisms are installed within the AV itself, within reach of an occupant of the AV. The occupant can activate the stopping mechanism from within the AV to cause the AV to stop the auto-propulsion of the AV. Such mechanisms are designed to allow an occupant to override, take-over, or cancel the motion of the AV under circumstances evaluated by the occupant as unsafe or unreliable for auto-propulsion. Such mechanisms are not available to a non-occupant of the AV.

Some other AVs, such as self-propelling drones and other radio-controlled toys or AVs can be remotely controlled by a user not occupying the AV. However, such control—including causing the auto-propulsion of the AV to stop—is a dedicated function of a controller unit in possession of the user. Other users or other controllers are unable to control the AV without special configuration, such as matching a frequency on which the controls are being transmitted and received by the AV.

SUMMARY

The illustrative embodiments provide a method, system, and computer program product. An embodiment includes a method that captures using an imaging device of a user device associated with a public user, an image of an AV operating in an area, wherein the public user associated with the user device is other than an occupant or controller of the AV. The embodiment performs image processing of the image of the AV to extract a set of visual characteristics of the AV, wherein a visual characteristic in the set of visual characteristics is insufficient to uniquely identify the AV. The embodiment selects from a set of AVs a subset of candidate AVs, wherein each candidate AV in the subset of candidate AVs matches within a tolerance at least one visual characteristic in the set of visual characteristics, the subset of candidate AVs including the AV. The embodiment sends a stop command to the AV, the sending causing the AV to execute a stopping operation resulting in a change in a velocity of the AV.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that there can be circumstances when a member of the public user—not an occupant of an AV, or a user operating a designated controller of an AV, or a user or controller specifically configured to control an AV—may have to control an auto-propulsion of an AV. Specifically, the member of the public user may have to bring the auto-propulsion of the AV to a stop in a safe and graceful manner. A member of the public user is hereinafter interchangeably referred to as a public user.

Some example circumstances where public user control of an AV is desirable include, but are not limited to—a malfunctioning AV without an occupant and out of range or non-responsive to a controller; an AV with an incapacitated occupant; self-driving car type AV malfunctioning inside a garage and ramming the walls or garage door; an AV involved in an accident where someone is pinned by the AV; and many others. The illustrative embodiments recognize that to address these and many other circumstances, a system should be Available by which a member of the public user—such as a bystander, an observer, or a witness of such operations of an AV—can cause a cessation of an undesirable auto-propulsion of the AV.

The illustrative embodiments recognize that the presently available tools or solutions do not address these needs/problems or provide adequate solutions for these needs/problems. The illustrative embodiments used to describe the invention generally address and solve the above-described problems and other related problems by public user deactivation of autonomous vehicles.

An embodiment can be implemented as a software application. The application implementing an embodiment, or one or more components thereof, can be configured as a modification of an existing user device—i.e., a native application in the user device, as an application executing in a data processing system communicating with an existing user device over a short-range radio network such as Bluetooth, over a wired or wireline local area network (LAN)—i.e., a local application on the LAN, as an application executing in a data processing system communicating with an existing user device over a wide area network (WAN)—i.e., a remote application on the WAN, as a separate application that operates in conjunction with an existing user device in collaboration with an application on the user device, a standalone application, or some combination thereof.

A user device is any device physically accessible to a public user, the device being capable of (i) ascertaining its own geographical location, (ii) capturing an image of objects, (iii) data communications, and (iv) at least some data computing capability. Some non-limiting examples of devices that qualify as a user device include a smartphone, a tablet computer, camera equipped wearable devices, and the like. A reference herein to a device is reference to a user device unless expressly distinguished where used.

Within the scope of the illustrative embodiments, the stopping operation, or the cessation of the auto-propulsion, can, but need not necessarily, cause the AV to come to a stand-still. The stopping operation can also reduce a speed of the AV, change a direction of the AV, cause a sequence of operations to occur at the AV that includes a change in the velocity of the AV. Some stopping operations may cause the AV to continue auto-propulsion until a safe time or place is reached for reduction in the speed of the AV, allowing egress from the AV, allowing physical access to the AV or inside the AV, or some combination of these and other similarly purposed operations.

Certain embodiments are described as operating in a combination of a user device, where the user device operates as a client, and a server data processing system. While such configuration is possible and contemplated, such a configuration is not necessary for the operation of an embodiment. An embodiment can be adapted as an entirely client-side application operating only in the user device where a database described herein is reachable from the user device, an entirely server-side application operating using a server data processing system where a user device-mounted imaging apparatus (e.g., a camera) is accessible to the server.

Certain assumptions are made for the correct configuration and operation of the illustrative embodiments. First assumption—a public user, and more particularly an imaging apparatus of a user device associated with the public user, can visually observe an AV on which the public user wishes to perform a stopping operation. Second assumption—the location information provided to communicate the location of the user device is not spoofed, masqueraded, blocked or otherwise altered to indicate a location other than where the user device is actually present at the time of capturing an image described herein. Third assumption—a database of operational AVs, or a repository of a suitable type adapted for a similar purpose, exists and includes accurate and sufficient information to (i) uniquely identify an AV using one or more characteristics of the AV, and (ii) locate the AV at any given time.

The characteristics of an AV contemplated herein are characteristics that are visually perceivable, such as by an imaging apparatus of a user device, and are usable in identifying the AV. The characteristic need not be usable to uniquely identify the AV, i.e., the characteristics of AVs are not limited to a unique identifier of the AV, e.g., a license plate number of an autonomous car. Some other examples of visual characteristics of AVs include a color, a shape, a size, a number of appendages, a type of an appendage, a style, a model, a make, a surface feature, a transparency or opacity, a marking present on a surface of the AV or a portion thereof.

An embodiment captures a visual image of an AV on which a public user intends to execute a stopping operation. For example, the public user may use a camera in a smartphone to take a picture of an autonomous car traveling on a street. The embodiment also captures a location from which the image is captured. For example, the location can be Global Positioning System (GPS) coordinates of the user device or imaging apparatus that has been used to capture the image.

One embodiment transmits the image and the location information to another application, e.g., to an embodiment executing in a server data processing system across a data network, and the embodiment in the server processes the image and the location as described herein. Another embodiment processes the image and the location at the user device in a manner described herein.

It is possible that an image may be captured accidentally, hastily, or in jest, and the public user either does not intend to perform the stopping operation on the AV or decides not to perform the stopping operation after deliberately capturing the image. To handle such cases, an embodiment implements an accidental activation prevention mechanism. The accidental activation prevention mechanism operates to allow the public user an opportunity to decide whether the public user indeed wishes to perform the stopping operation on the AV.

The accidental activation prevention mechanism can take any form suitable for a given implementation. For example, a button image that the public user has to click to send the image and the location information may require additional steps before the button can be pressed. As another example, the button may be obscured until the user has performed another action, such as swiping a touchscreen to lift a cover graphic from the button. The cover graphic may have a viscosity characteristic which requires a certain force or speed to be applied to the swipe for the cover graphic to expose the button. The cover graphic may expose the button at a certain rate where the rate is configured to give the public user a determined amount of time before the public user can press the button. A pop-up confirmation question may be presented to the public user before the public user can transmit the information. A CAPTCHA (Completely Automated Public Turing test to tell Computers and Humans Apart) code may be activated before the transmission.

These examples of accidental activation prevention mechanism are not intended to be limiting. From this disclosure, those of ordinary skill in the art will be able to conceive many other accidental activation prevention mechanisms to prevent or delay a public user from accidentally or unintentionally activating a stopping operation on an AV, and the same are contemplated within the scope of the illustrative embodiments.

An embodiment uses the image and the location information to identify the AV. The embodiment performs image processing using a known image processing and recognition technique to identify one or more visual characteristics of the AV in the image. The embodiment uses a database of operational AVs to identify the AV in question. Particularly, the embodiment queries the database to obtain a set of AVs operating within a specified radius from the location, and having one or more visual characteristics extracted from the image. The area need not necessarily be defined as a circle of a radius. Other manners of specifying an area relative to a location—such as a set of coordinates defining a polygon that encloses the location—can be used in a similar manner.

In one implementation, such an embodiment may execute on a server and perform the image processing, accessing the database, and querying and obtaining the result set at or from the server. In another implementation, such an embodiment may execute on the user device, and perform the image processing, accessing the database, and querying and obtaining the result set at or from the user device.

The set of AVs returned by the database includes those AVs that are or were operating in the given radius from the supplied location, and were identifiable using at least one supplied visual characteristic extracted from the captured image. From the set of AVs, several actions are possible. One embodiment can trigger a stopping operation on all the AVs returned in the result set. Another embodiment can perform a second level of analysis to narrow the set of AVs to a subset of candidate AVs.

One embodiment presents the set of AVs to the public user and asks the public user to identify the particular AV on which the stopping operation should be performed. Another embodiment selects a most likely candidate AV from the set using an additional visual characteristic extracted from the captured image. Another embodiment may use a map or knowledge of the area within the radius to exclude those AVs from the set which would be visually obscured from the public user, e.g., by a building, a blind turn, or other obstruction. An embodiment can combine more than one of these and other similarly purposed techniques to reduce the set of AVs to a subset of candidate AVs. In one case, the subset includes only one candidate AV.

Before a stopping operation can be performed on one or more candidate AVs, an embodiment performs further checks to ensure that the public user is not misusing or maliciously using the stopping operation on a candidate AV. It is possible that in a genuine circumstance that warrants the stopping operation, more than one public users will request the stopping operation by sending images of the AV and their locations. One embodiment correlates one public user's request data with another public user's request data. For example, the embodiment may determine that for a genuine circumstance, locations of two or more public users are within a threshold distance from one another, the images captured by two or more public users include a common AV, or both.

Another embodiment can verify that a circumstance for a stopping operation exist using other types of data. For example, a law enforcement source may also provide data of an incident involving an AV in the image from a public user within a threshold distance from the location of the public user. Other external sources, such as a news source, a social media platform, or a crowd-sourced repository may also provide similar data. The embodiment corroborates the public user's request for stopping operation on an AV using such law enforcement data, news data, social media data, crowd-sourced data, and other similarly usable external data.

The stopping operation can be performed on an AV by sending a stop command to the AV. A system in the AV is configured to execute the stopping operation upon receiving the stop command. The stop command can take many suitable forms. For example, in one case, the stop command comprises command instruction transmitted to the AV in a data transmission, which the AV is capable of receiving wirelessly.

In another case, the stop command comprises command instruction transmitted to the AV in a wavelength band of the electromagnetic wave spectrum, which the AV is capable of receiving. As some non-limiting examples, the transmission may be in visible wavelengths, infrared wavelengths, ultraviolet wavelengths, or microwave wavelengths.

In another case, the stop command comprises command instruction transmitted to the AV in a sonic frequency band, which the AV is capable of receiving. As some non-limiting examples, the transmission may be in human-audible, infra-human-audible, or ultra-human-audible frequencies.

More than one AVs can be present in the set of AVs returned from the database, or in a reduced subset of AVs computed from the returned set. Each AV in such a set or subset has a likelihood of being the AV on which the user intended to apply the stopping operation. When a stopping operation is to be applied to more than one AV, an embodiment causes the stopping operation to be applied to AVs in the set or the reduced subset in a descending order of the likelihood. If the stopping operation is accomplished using a signal from the user's device, one embodiment allows the user device to accept an input when the stopping operation has been applied to the intended AV. In response to the input, the embodiment ceases further applying the stopping operation to the AVs remaining in the set or the reduced subset.

Preferably, the AV should be configured in such a manner that if a stopping operation is received at the AV, the AV executes the stopping operation only after performing a self-evaluation, which ascertains that a genuinely abnormal circumstance for the stopping operation exists in or with the AV. So, an AV that is operating normally and without any indication of an abnormal circumstance may ignore a stopping operation received by the AV. Some example ways of determining whether an abnormal circumstance exists is by verifying whether a code or signal is presented by an onboard data processing system, an occupant is incapacitated according to an onboard sensor, an impact has occurred or is imminent according to a sensor, an unusual force has been applied to the AV or a part thereof according to a sensor, and many others.

One type of stop command can be configured in such a way that allows an AV to perform a self-evaluation as described herein before deciding whether the AV will perform the stopping operation according to the stop command. Another type of stop command can be configured in such a way that forces an AV to bypass this type of self-evaluation and force the AV to comply with the stopping operation. This type of forcing might be necessary, for example, when not the AV but another AV in the vicinity is experiencing an abnormal circumstance that justifies stopping all nearby AVs. A stop command can be configured using the presence or absence of designated codes, formats, values, or some combination thereof within the command to indicate whether the AV is allowed to perform the self-evaluation before deciding whether the execute the command.

One embodiment operating in a server data processing system constructs a suitable stop command according to the circumstance. The embodiment transmits the stop command to one or more candidate AVs.

Another embodiment operating in a server data processing system constructs a suitable stop command authorization according to the circumstance. The authorization is user device-specific and allows the user device to transmit the stop command to one or more candidate AVs. In one case, the authorization is also time-limited in that the authorization is only valid for a pre-determined duration from the time the authorization is sent to the user device. In another case, the authorization is also area-limited in that the authorization is only valid for a pre-determined area including the location that was sent in the request from the user device. In another case, the authorization is also code-limited in that the authorization is only valid for pre-determined types of stop commands transmittable from the user device. One or more of these or other similarly purposed restrictions can be combined in an authorization within the scope of the illustrative embodiments.

In one configuration, a server-side embodiment transmits the stop command to a candidate AV. In another configuration, a client-side embodiment transmits the stop command to a candidate AV without an authorization being required. In another configuration, a server-side embodiment transmits an authorization to a client-side embodiment, and the client-side embodiment transmits the stop command to a candidate AV upon valid and suitable authorization. The authorization can be pre-configured in the client-side embodiment, delivered to the client-side embodiment as an input or transmission, or may be provided as a default for certain types of stop commands.

In one case, a server-side embodiment constructs the stop command and transmits the stop command to a candidate AV. In another case, a client-side embodiment constructs the stop command and transmits the stop command to a candidate AV. In another case, a client-side embodiment constructs the stop command, and the client-side embodiment transmits the stop command to a candidate AV only upon a valid and suitable authorization. In another case, a server-side embodiment constructs the stop command, the server-side embodiment transmits the stop command and optionally an authorization to a client-side embodiment, and the client-side embodiment transmits the stop command to a candidate AV. In one embodiment, the authorization, the stop command, or both may be transmitted to the client-side embodiment in the same user device which transmitted the request with the image and location information.

The manner of public deactivation of autonomous vehicles described herein is unavailable in the presently available methods. A method of an embodiment described herein, when implemented to execute on a device or data processing system, comprises substantial advancement of the functionality of that device or data processing system in enabling the device or data processing system to allow a public user to cause a candidate AV to perform a stopping operation.

The illustrative embodiments are described with respect to certain types of AVs, circumstances, stopping operations, images, visual characteristics, location information, area or radius, commands, authorizations, self-evaluation, sensors, user devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
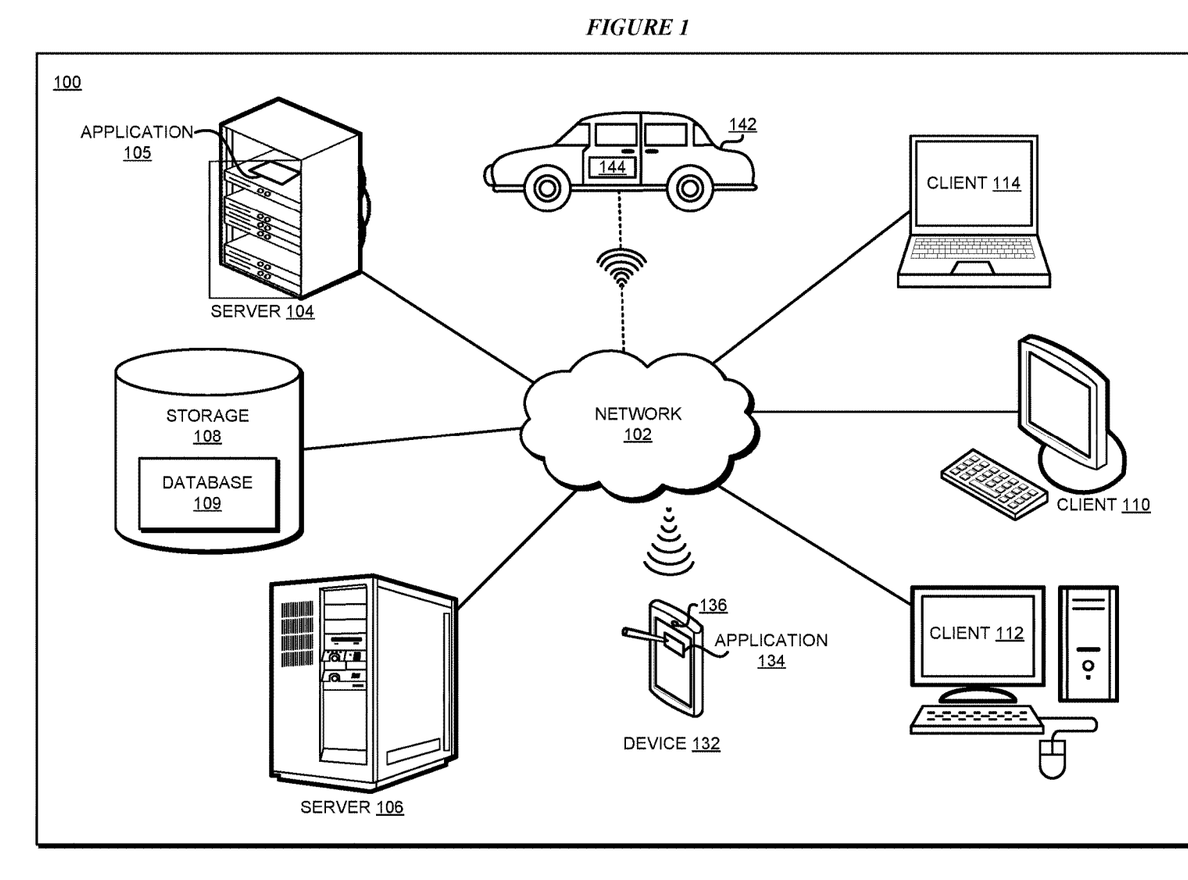
FIG. 1 depicts a block diagram of a network of data processing systems in which illustrative embodiments may be implemented.
Figure 2:
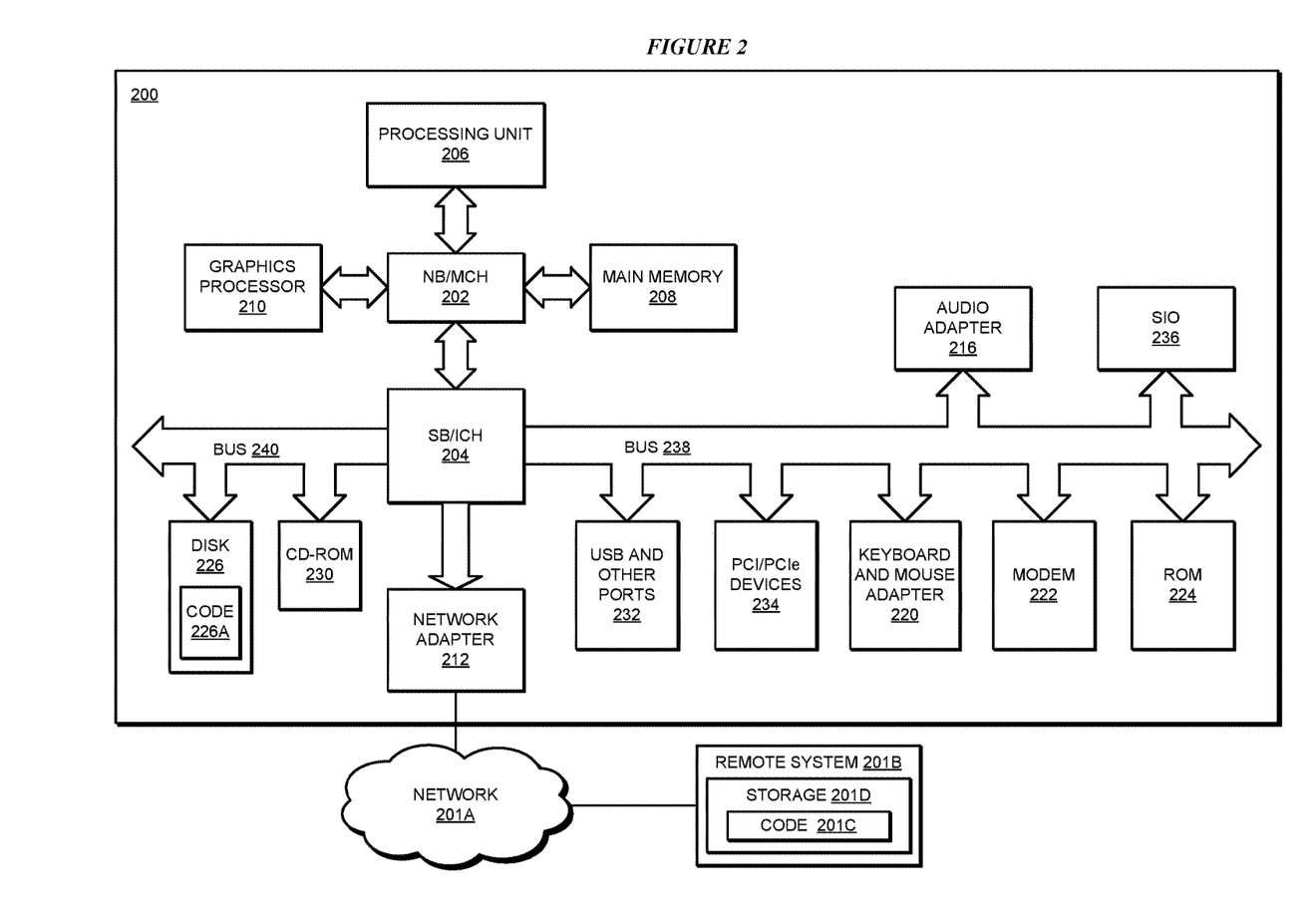
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a user device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

When applicable in a particular configuration, application 105 implements a server-side embodiment described herein. Application 134 implements a client-side embodiment described herein. Camera 136 is an example of an imaging apparatus usable for capturing a visual image of AV 142. AV 142 is a non-limiting example of AVs described herein. System 144 in AV 142 is configured to receive stopping operations, perform self-evaluation, execute a suitable stopping operation from a set of possible stopping operations based on a circumstance in which the stopping operation is to be executed. Database 109 is a suitable repository usable to identify and locate an AV as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a portable computing or communication device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
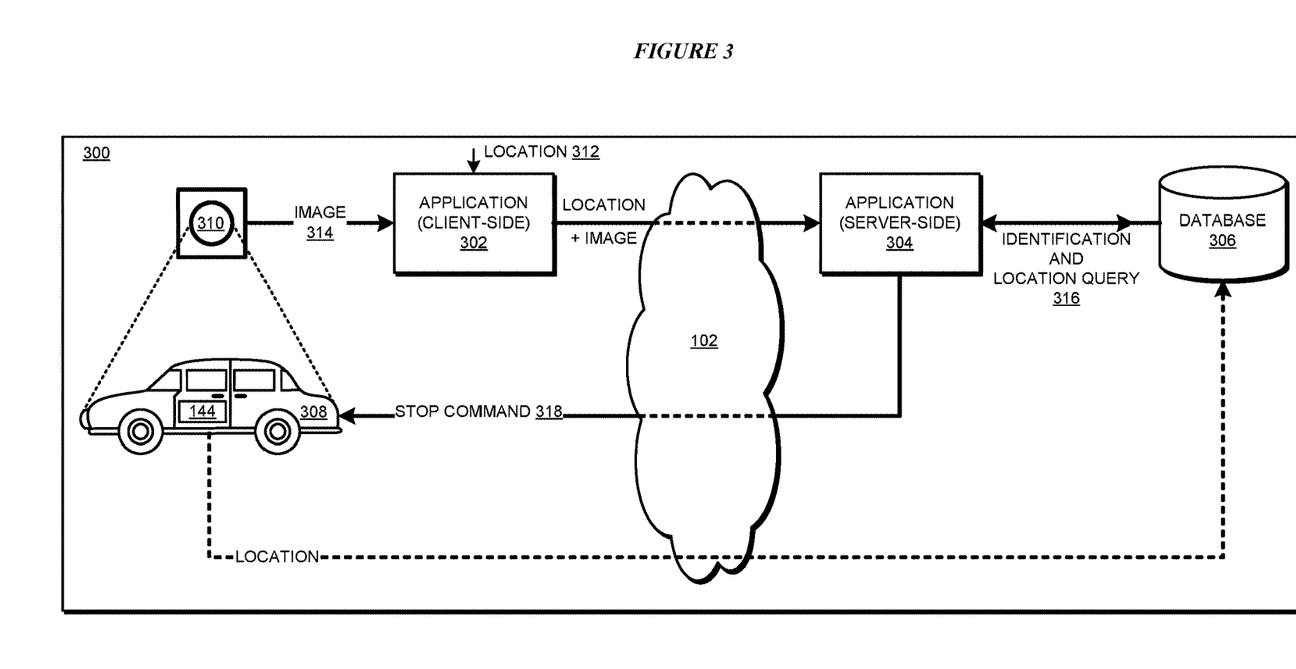
FIG. 3 depicts a block diagram of an example configuration for public deactivation of autonomous vehicles in accordance with an illustrative embodiment.

With reference to FIG. 3, this figure depicts a block diagram of an example configuration for public deactivation of autonomous vehicles in accordance with an illustrative embodiment. Configuration 300 uses a non-limiting client-server configuration employing a client-side embodiment and a server-side embodiment. Application 302 is an example of application 134 in FIG. 1. Application 304 is an example of application 105 in FIG. 1. Database 306 is an example of database 109 in FIG. 1. AV 308 is an example of AV 142 in FIG. 1. Camera 310 is an example of imaging apparatus 136 in FIG. 1.

Camera 310 is located at a geographical location. As an example, suppose that a user device (not shown) in which camera 310 and application 302 are operating computes location information 312. Camera 310 capture image 314 of AV 308 from location 314 and sends image 314 to application 302.

In the depicted configuration, application 302 sends location 312 and image 314 to application 304. Application 304 extracts a set of visual characteristics of AV 308 from image 314. Application 304 sends query 316 to database 306. Query 316 includes one or more visual characteristics of image 314 and location 312.

Optionally, query 316 also includes a radius or another type of area definition to be used from location 312. In one embodiment, database 306 uses a default radius. Optionally, query 316 also includes a time of AV operation to be used from location 312. In one embodiment, database 306 uses the time the query is received (adjusted by an optional time to account for transmission delays) as a default time of AV operation.

Database 306 returns a set of AVs operating in the area defined by location 312 and the radius or other area definition, during a period including the time, and having the specified visual characteristic(s). Application 304 identifies from the set of AVs, a subset of candidate AVs. The subset of candidate AVs includes AV 308. Application 304 sends stop command 318 to AV 308.

System 144 computes the location of AV 308 from time to time and keeps the location of AV 308 current in database 306 within the specified recency requirement of database 306. System 144 in AV 308 receives stop command 318. System 144 may, but need not necessarily, perform a self-evaluation under certain circumstances before electing to execute, or executing, stop command 318.

In an alternate configuration (not shown), application 302 performs the operations described with respect to application 304. In such a configuration, application 304 may not exist at all, or may implement only that functionality which is not implemented in application 302 for implementation-specific reasons.

Figure 4:
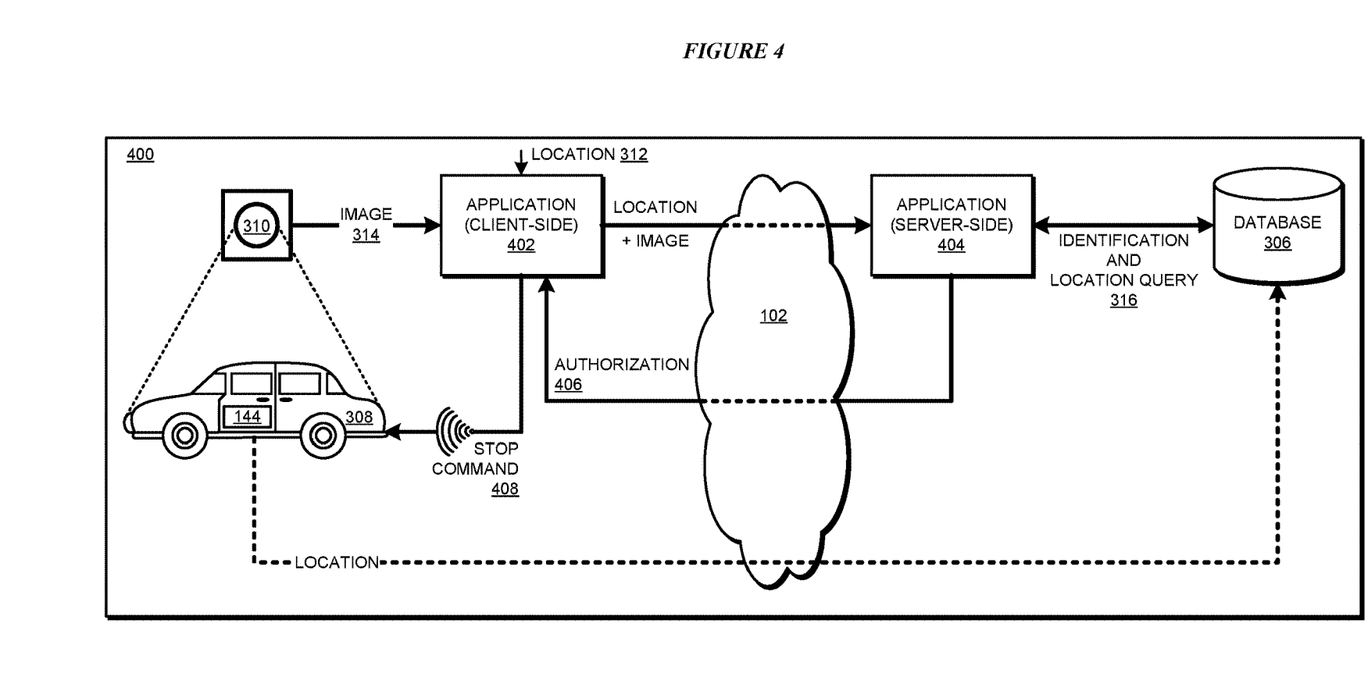
FIG. 4 depicts another example configuration for public deactivation of autonomous vehicles in accordance with an illustrative embodiment.

With reference to FIG. 4, this figure depicts another example configuration for public deactivation of autonomous vehicles in accordance with an illustrative embodiment. In configuration 400, elements 144, 306, 308, 312, 314, and 316 are the same and operate in the same manner as in the configuration of FIG. 3.

In the depicted configuration, application 402 sends location 312 and image 314 to application 404. Application 404 extracts a set of visual characteristics of AV 308 from image 314. Application 404 sends query 316 to database 306. Database 306 returns a set of AVs to application 404. Application 404 identifies from the set of AVs, a subset of candidate AVs. The subset of candidate AVs includes AV 308.

In configuration 400, application 404 sends authorization 406 to application 402. Application 402 constructs stop command 408 according to authorization 406. Application 402 sends command 408 to AV 308. System 144 in AV 308 operates on stop command 408 in a manner similar to command 318 in FIG. 3.

In an alternate configuration (not shown), authorization 406 may also include stop command 408 or a variation thereof. In such a configuration, application 402 either transmits the received stop command or modifies the received stop command to form command 408 and transmits command 408 as described herein.

In another alternate configuration (not shown), application 402 performs the operations described with respect to application 404. In such a configuration, application 404 may not exist at all, or may implement only an authorization functionality for authorizing application 402, as described herein.

Figure 5:
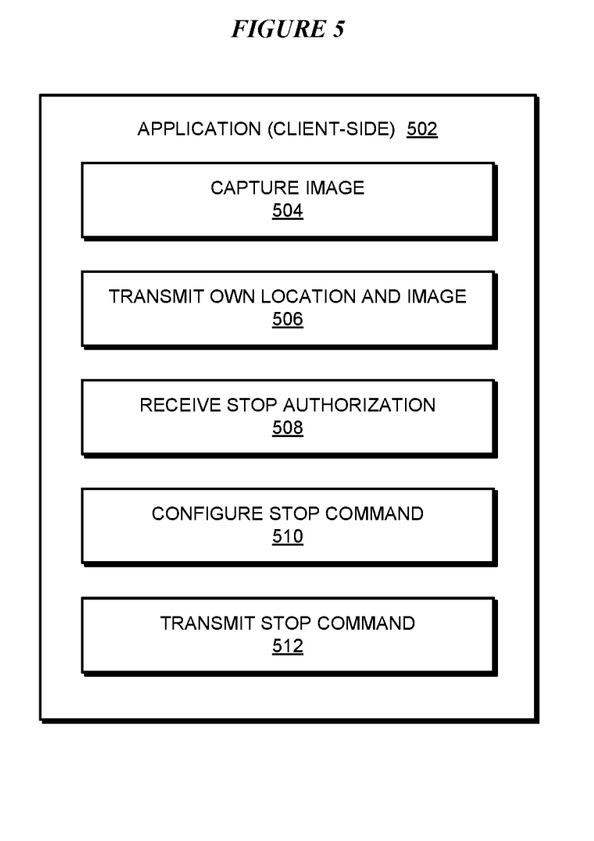
FIG. 5 depicts one example configuration of an application for public deactivation of autonomous vehicles in accordance with an illustrative embodiment.

With reference to FIG. 5, this figure depicts one example configuration of an application for public deactivation of autonomous vehicles in accordance with an illustrative embodiment. Application 502 is an example of application 302 in FIG. 3 or 402 in FIG. 4.

Component 504 capture an image of an AV that is to be stopped. For example, component 504 uses camera 310 to capture image 314 of AV 308, as in FIGS. 3 and 4.

Figure 6:
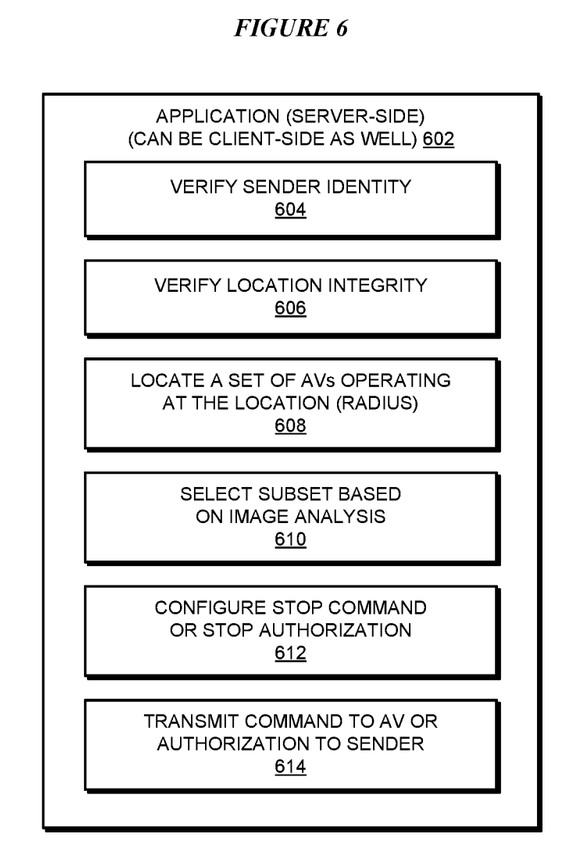
FIG. 6 depicts another example configuration of an application for public deactivation of autonomous vehicles in accordance with an illustrative embodiment.

Component 506 transmits a location and the image to a server-side application 602 in FIG. 6, when application 602 is implemented on a server data processing system. The location can be captured in any suitable manner, e.g., using a GPS module of a user device where application 502 may be executing.

When an authorization mechanism is implemented, component 508 receives an authorization to perform a stopping operation on a candidate AV in the image. Component 510 configures a stop command. When a stop command is also received with the authorization, component 510 adapts or alters the received stop command as may be needed in a given implementation.

Component 512 transmits the stop command to the candidate AV. Components 508, 510, and 512 operate when the stop command to a candidate AV flows to the candidate AV through application 502.

With reference to FIG. 6, this figure depicts another example configuration of an application for public deactivation of autonomous vehicles in accordance with an illustrative embodiment. Application 602 is an example of application 304 in FIG. 3 or 404 in FIG. 4. An implementation can elect to implement some or all of the functions described in application 602, in application 502 of FIG. 5.

Component 604 verifies that the sender of the request, e.g., application 502 of FIG. 5 or a user associated therewith, is authorized to, or at least not prevented from, causing an AV to perform a stopping operation. For example, there may exist a blacklist of persons or devices that are known to be malicious for some reasons, and who should not be trusted to cause stopping operations on AVs.

Component 606 verifies the integrity of the location information in the request, e.g., to determine if the location is spoofed or modified. Component 606 also performs the corroboration function using external data and/or a request from another public user as described herein.

Component 608 locate a set of AVs operating in an area including the location in the request. For example, component 608 constructs query 316 and interacts with database 306 to obtain the information about the set of AVs. Component 610 selects a subset of the AVs based on a visual characteristic or other verification operation as described earlier.

When application 602 is configured to send the stop commands, component 612 configures a stop command for a candidate AV in the subset. When application 502 of FIG. 5 is configured to send the stop commands, component 612 configures a stop authorization for application 502. In some implementation, component 612 may construct the stop command and the stop authorization for sending to application 502 as described herein.

When application 602 is configured to send the stop commands to candidate AVs, component 614 transmits the stop command to a candidate AV. When application 602 is configured to send the stop authorization to application 502, component 614 transmits the stop authorization to application 502. When application 602 is configured to send the stop commands to application 502, component 614 transmits the stop command to application 502.

Figure 7:
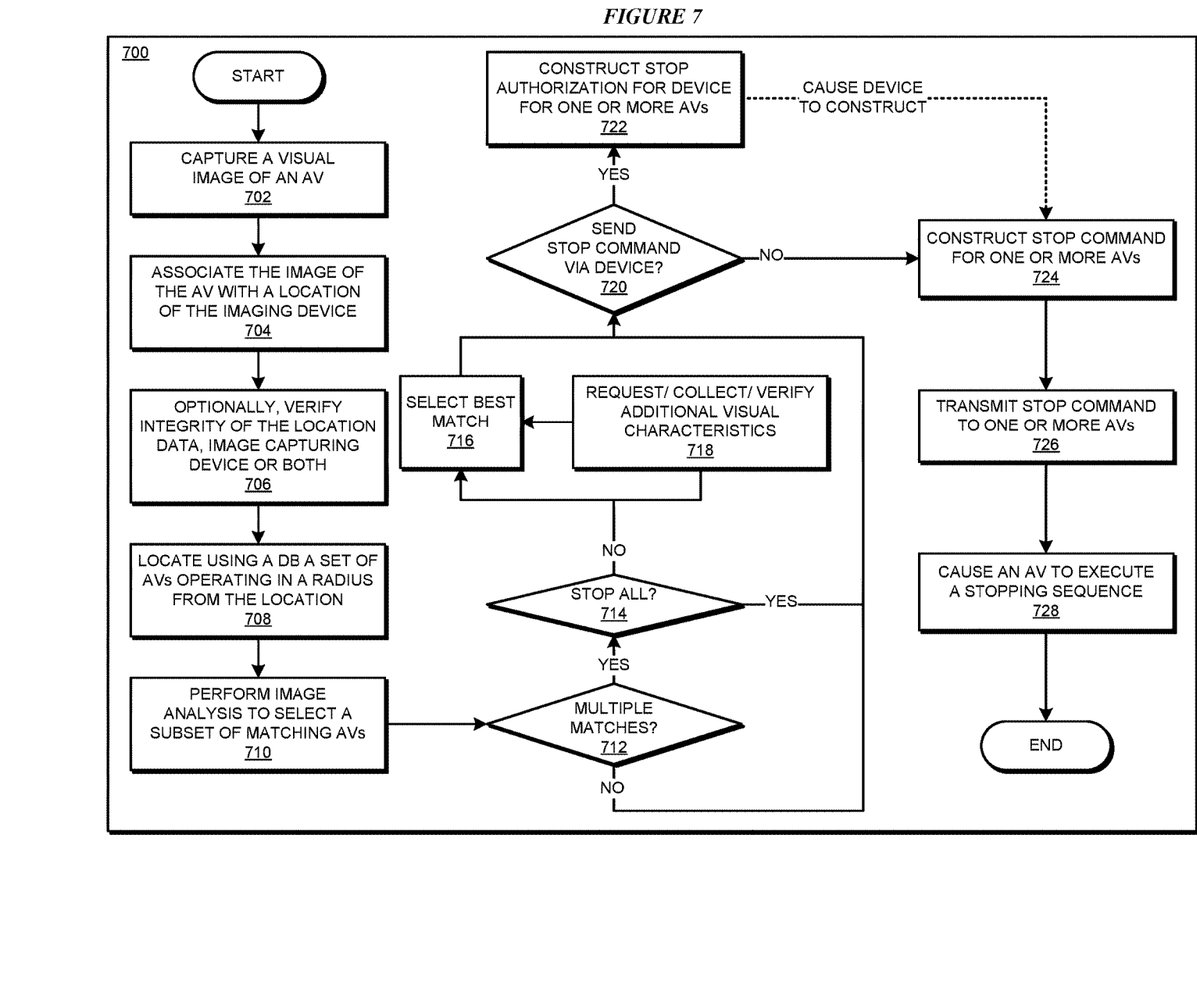
FIG. 7 depicts a flowchart of an example process for public deactivation of autonomous vehicles in accordance with an illustrative embodiment.

With reference to FIG. 7, this figure depicts a flowchart of an example process for public deactivation of autonomous vehicles in accordance with an illustrative embodiment. Process 700 can be implemented entirely in a combined implementation of applications 502 and 602, or be distributed across application 502 and application 602 when the applications are implemented separately.

An application captures a visual image of an AV (block 702). The application associated the image of the AV with a location of the imaging apparatus (block 704).

The application optionally verifies the sending public user's identity, sending user device's identity, integrity of the location data, or a combination thereof (block 706). The application locates a set of AVs operating in an area relative to the location (block 708). The application performs image analysis on the captured image to select a subset of AVs that match at least one visual characteristic extracted from the image (block 710).

When multiple matches exist in the set of AVs ("Yes" path of block 712), the application determines whether all matching AVs are candidates and should be send stopping operations (block 714). When a single match is found in the set of AVs ("No" path of block 712), the application proceeds to block 720.

When not all candidate AVs are to perform the stopping operations ("No" path of block 714), the application performs one or both of two options—the application selects the best match from the subset of candidate AVs (block 716). Alternatively, or together with block 716, the application requests, collects, or verifies additional visual characteristics of the AV desired to be stopped (block 718). The application proceeds to block 716 to find the best match with the additional characteristic.

Once the best matching AV has been selected at block 716, or all AVs in the set are to be stopped, the application determines whether the stop command is to be sent via the user device (block 720). If the user device is to send the stop command to a candidate AV ("Yes" path of block 720, the application optionally constructs a stop authorization for the user device (block 722). The authorization causes the user device to construct a stop command as described herein.

If the stop command is not to be transmitted from the user device ("No" path of block 720), the application constructs the stop command (block 724). The application transmits the stop command to one or more candidate AVs, as the case may be (block 726). The transmission causes an AV to execute a stopping operation (block 728). The application ends process 700 thereafter.

Thus, a computer implemented method, system or apparatus, and computer program product are provided in the illustrative embodiments for public deactivation of autonomous vehicles and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   capturing using an imaging capability of a user device associated with a public user, an image of an autonomous vehicle (AV) operating in an area, wherein the public user associated with the user device is other than an occupant or controller of the AV;
   performing image processing of the image of the AV to extract a set of visual characteristics of the AV, wherein a visual characteristic in the set of visual characteristics is insufficient to uniquely identify the AV;
   selecting from a set of AVs a subset of candidate AVs, wherein each candidate AV in the subset of candidate AVs matches within a tolerance at least one visual characteristic in the set of visual characteristics, the subset of candidate AVs including the AV;
   sending a stop command to the AV, the sending causing the AV to execute a stopping operation resulting in a decrease in a speed of the AV.

2. The method of claim 1, further comprising:
   authorizing the user device to transmit the stop command to the AV, wherein the authorizing is specifically for the user device.

3. The method of claim 2, further comprising:
   constructing the stop command at the user device, wherein the sending the stop command to the AV is performed by the user device.

4. The method of claim 1, further comprising:
   sending the stop command to each candidate AV in the subset of candidate AVs, wherein the stop command causes each candidate AV to perform a corresponding sequence of operations.

5. The method of claim 4, further comprising:
   causing at a first candidate AV, a self-evaluation, as a part of a sequence of operation corresponding to the first candidate AV, the self-evaluation determining whether the first candidate AV has an indication of an abnormal circumstance; and
   causing, responsive to a negative indication, the first candidate AV to ignore the stop command.

6. The method of claim 5, further comprising:
   causing at a second candidate AV, a second self-evaluation, as a part of a second sequence of operation corresponding to the second candidate AV, the second self-evaluation determining whether the second candidate AV has a second indication of a second abnormal circumstance; and
   causing, responsive to a positive indication, the second candidate AV to execute a second stopping operation corresponding to the stop command.

7. The method of claim 4, further comprising:
   causing at a first candidate AV, an omission a self-evaluation in a sequence of operation corresponding to the first candidate AV, the omission resulting from the stop command having a form configured to cause the omission, the form being selected from the group consisting of designated codes, formats, values, or any combination thereof; and
   causing, responsive to the omission, the first candidate AV to execute a first stopping operation corresponding to the stop command.

8. The method of claim 1, further comprising:
   sending from the user device a request to cause the AV to perform the stopping operation at the AV, the request comprising the image and a location of the user device.

9. The method of claim 8, further comprising:
   validating, prior to sending the request, that the user device and the public user are not prevented from causing the AV to perform the stopping operation.

10. The method of claim 8, further comprising:
    validating, prior to sending the request, that a location of the user device has not been spoofed.

11. The method of claim 8, further comprising:
    causing a delay between the public user inputting the request at the user device and sending the request from the user device.

12. The method of claim 1, further comprising:
    computing, at a time of capturing the image, a location of the user device; and defining the area as a polygon enclosing the location of the user device.

13. The method of claim 1, further comprising:
    identifying the set of AVs operating in the area at a time when the image was captured, wherein the identifying the set of AVs is responsive to querying a repository of location information corresponding to a superset of operational AVs, the querying selecting the set of AVs from the superset based on a location of the user device.

14. The method of claim 13, wherein the querying further selects the set of AVs from the superset based on a first visual characteristic from the set of visual characteristics.

15. The method of claim 1, wherein the AV comprises one of an autonomously operating automobile, an autonomously operating robotic entity, and an autonomously operating drone.

16. The method of claim 1, wherein the visual characteristic comprises one of a color of the AV, a model of the AV, a number of appendages of the AV, and a type of an appendage of the AV.

17. A computer usable program product comprising one or more computer-readable storage devices, and program instructions stored on at least one of the one or more storage devices, the stored program instructions comprising:

program instructions to capture using an imaging capability of a user device associated with a public user, an image of an autonomous vehicle (AV) operating in an area, wherein the public user associated with the user device is other than an occupant or controller of the AV;

program instructions to perform image processing of the image of the AV to extract a set of visual characteristics of the AV, wherein a visual characteristic in the set of visual characteristics is insufficient to uniquely identify the AV;

program instructions to select from a set of AVs a subset of candidate AVs, wherein each candidate AV in the subset of candidate AVs matches within a tolerance at least one visual characteristic in the set of visual characteristics, the subset of candidate AVs including the AV;

program instructions to cause the AV to execute a stopping operation by sending a stop command to the AV, the stopping operation resulting in a decrease in a speed of the AV.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to capture using an imaging capability of a user device associated with a public user, an image of an autonomous vehicle (AV) operating in an area, wherein the public user associated with the user device is other than an occupant or controller of the AV;

program instructions to perform image processing of the image of the AV to extract a set of visual characteristics of the AV, wherein a visual characteristic in the set of visual characteristics is insufficient to uniquely identify the AV;

program instructions to select from a set of AVs a subset of candidate AVs, wherein each candidate AV in the subset of candidate AVs matches within a tolerance at least one visual characteristic in the set of visual characteristics, the subset of candidate AVs including the AV;

program instructions to cause the AV to execute a stopping operation by sending a stop command to the AV, the stopping operation resulting in a decrease in a speed of the AV.

* * * * *